United States Patent
Kumar et al.

(10) Patent No.: US 8,673,159 B2
(45) Date of Patent: Mar. 18, 2014

(54) ENHANCED IN-LINE ROTARY SEPARATOR

(75) Inventors: Jay Kumar, Houston, TX (US); H. Allan Kidd, Shinglehouse, PA (US); William Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 13/810,082

(22) PCT Filed: Jun. 28, 2011

(86) PCT No.: PCT/US2011/042205
§ 371 (c)(1),
(2), (4) Date: Aug. 26, 2013

(87) PCT Pub. No.: WO2012/009158
PCT Pub. Date: Jan. 19, 2012

(65) Prior Publication Data
US 2013/0327725 A1    Dec. 12, 2013

Related U.S. Application Data

(60) Provisional application No. 61/364,669, filed on Jul. 15, 2010.

(51) Int. Cl.
*B01D 17/038*    (2006.01)
*B04B 5/02*    (2006.01)
*B04B 5/04*    (2006.01)

(52) U.S. Cl.
USPC ............. 210/787; 210/360.1; 210/380.1; 210/380.3; 96/216; 55/337; 55/457; 494/43

(58) Field of Classification Search
USPC .......... 210/360.1, 380.1, 380.3, 787; 96/216; 55/337, 457; 494/43
See application file for complete search history.

(56) References Cited

U.S. PATENT DOCUMENTS

| 815,812 A | 3/1906 | Gow |
|---|---|---|
| 1,057,613 A | 4/1913 | Baldwin |

(Continued)

FOREIGN PATENT DOCUMENTS

| AU | 2005282269 | 9/2005 |
|---|---|---|
| AU | 2010202069 | 6/2010 |

(Continued)

OTHER PUBLICATIONS

Bi-Phase Rotary Separator Turbine, Multiphase Power & Processing Technologies LLC Technical literature (available at http://www.mpptech.com/techppp/pdfs/Bi-Phase.pdf).

(Continued)

*Primary Examiner* — David A Reifsnyder
(74) *Attorney, Agent, or Firm* — Edmonds & Nolte, PC

(57) ABSTRACT

Apparatus and methods for separating a fluid, with the apparatus including a rotatable drum having an inner drum wall and an outer drum wall disposed around the inner drum wall to define a separation passage therebetween. The apparatus also includes radial separator blades that are curved in a circumferential direction and are disposed in the separation passage of the drum, the radial separator blades extending radially at least partially between the inner drum wall and the outer drum wall. The apparatus further includes a first circumferential separator blade that is curved in a radial direction and is disposed in the separation passage of the drum, the first circumferential separator blade extending at least partially around the inner drum wall. The apparatus also includes a housing disposed around the drum and configured to receive a higher-density component of the fluid separated in the separation passage.

20 Claims, 5 Drawing Sheets

(56) References Cited

U.S. PATENT DOCUMENTS

| | | |
|---|---|---|
| 1,061,656 A | 5/1913 | Black |
| 1,480,775 A | 1/1924 | Marien |
| 1,622,768 A | 3/1927 | Cook |
| 1,642,454 A | 9/1927 | Malmstrom |
| 2,006,244 A | 6/1935 | Kopsa |
| 2,300,766 A | 11/1942 | Baumann |
| 2,328,031 A | 8/1943 | Risley |
| 2,345,437 A | 3/1944 | Tinker |
| 2,347,939 A | 5/1944 | Down |
| 2,383,244 A | 8/1945 | Farmer |
| 2,720,313 A | 12/1951 | Pattison |
| 2,602,462 A | 7/1952 | Barrett |
| 2,743,865 A | 5/1956 | Graae |
| 2,811,303 A | 10/1957 | Ault |
| 2,836,117 A | 5/1958 | Lankford |
| 2,868,565 A | 1/1959 | Suderow |
| 2,897,917 A | 8/1959 | Hunter |
| 2,932,360 A | 4/1960 | Hungate |
| 2,954,841 A | 10/1960 | Reistle |
| 2,955,673 A | 10/1960 | Kennedy |
| 3,044,657 A | 7/1962 | Horton |
| 3,175,572 A | 3/1965 | Kauer, Jr. |
| 3,191,364 A | 6/1965 | Sylvan |
| 3,198,214 A | 8/1965 | Lorenz |
| 3,204,696 A | 9/1965 | De Priester |
| 3,213,794 A | 10/1965 | Adams |
| 3,220,245 A | 11/1965 | Van Winkle |
| 3,273,325 A | 9/1966 | Gerhold |
| 3,341,111 A | 9/1967 | Sanders |
| 3,352,577 A | 11/1967 | Medney |
| 3,395,511 A | 8/1968 | Akerman |
| 3,402,434 A | 9/1968 | Kajimura et al. |
| 3,431,747 A | 3/1969 | Hasheimi |
| 3,454,163 A | 7/1969 | Read |
| 3,487,432 A | 12/1969 | Jenson |
| 3,490,209 A | 1/1970 | Fernandes |
| 3,500,614 A | 3/1970 | Soo |
| 3,548,568 A | 12/1970 | Carlson, Jr. |
| 3,578,342 A | 5/1971 | Satterthwaite et al. |
| 3,628,812 A | 12/1971 | Larraide |
| 3,646,727 A | 3/1972 | Wachsmuth |
| 3,672,733 A | 6/1972 | Arsenius |
| 3,694,103 A | 9/1972 | Cohen |
| 3,810,347 A | 5/1974 | Kartinen |
| 3,814,486 A | 6/1974 | Schurger |
| 3,829,179 A | 8/1974 | Kurita |
| 3,915,673 A | 10/1975 | Tamai |
| 3,973,930 A | 8/1976 | Burgess |
| 3,975,123 A | 8/1976 | Schibbye |
| 4,033,647 A | 7/1977 | Beavers |
| 4,043,353 A | 8/1977 | Shirey |
| 4,059,364 A | 11/1977 | Andersen |
| 4,078,809 A | 3/1978 | Garrick |
| 4,087,261 A | 5/1978 | Hays |
| 4,103,899 A | 8/1978 | Turner |
| 4,112,687 A | 9/1978 | Dixon |
| 4,117,359 A | 9/1978 | Wehde |
| 4,135,542 A | 1/1979 | Chisholm |
| 4,141,283 A | 2/1979 | Swanson |
| 4,146,261 A | 3/1979 | Edmaier |
| 4,165,622 A | 8/1979 | Brown, Jr. |
| 4,174,925 A | 11/1979 | Pfenning |
| 4,182,480 A | 1/1980 | Theyse |
| 4,197,990 A | 4/1980 | Carberg |
| 4,205,927 A | 6/1980 | Simmons |
| 4,227,373 A | 10/1980 | Amend |
| 4,258,551 A | 3/1981 | Ritzi |
| 4,259,045 A | 3/1981 | Teruyama |
| 4,278,200 A | 7/1981 | Gunnewig |
| 4,298,311 A | 11/1981 | Ritzi |
| 4,303,372 A | 12/1981 | Caffrey |
| 4,333,748 A | 6/1982 | Erickson |
| 4,334,592 A | 6/1982 | Fair |
| 4,336,693 A | 6/1982 | Hays |
| 4,339,923 A | 7/1982 | Hays |
| 4,347,900 A | 9/1982 | Barrington |
| 4,363,608 A | 12/1982 | Mulders |
| 4,374,583 A | 2/1983 | Barrington |
| 4,375,975 A | 3/1983 | McNicholas |
| 4,382,804 A | 5/1983 | Mellor |
| 4,384,724 A | 5/1983 | Derman |
| 4,391,102 A | 7/1983 | Studhalter |
| 4,396,361 A | 8/1983 | Fraser |
| 4,432,470 A | 2/1984 | Sopha |
| 4,438,638 A | 3/1984 | Hays |
| 4,441,322 A | 4/1984 | Ritzi |
| 4,442,925 A | 4/1984 | Fukushima |
| 4,453,893 A | 6/1984 | Hutmaker |
| 4,453,894 A | 6/1984 | Ferone |
| 4,463,567 A | 8/1984 | Amend |
| 4,468,234 A | 8/1984 | McNicholas |
| 4,471,795 A | 9/1984 | Linhardt |
| 4,477,223 A | 10/1984 | Giroux |
| 4,502,839 A | 3/1985 | Maddox |
| 4,511,309 A | 4/1985 | Maddox |
| 4,531,888 A | 7/1985 | Buchelt |
| 4,536,134 A | 8/1985 | Huiber |
| 4,541,531 A | 9/1985 | Brule |
| 4,541,607 A | 9/1985 | Hotger |
| 4,573,527 A | 3/1986 | McDonough |
| 4,574,815 A | 3/1986 | West |
| 4,648,806 A | 3/1987 | Alexander |
| 4,650,578 A | 3/1987 | Cerdan |
| 4,687,017 A | 8/1987 | Danko |
| 4,721,561 A | 1/1988 | Oetiker |
| 4,737,081 A | 4/1988 | Nakajima |
| 4,752,185 A | 6/1988 | Butler |
| 4,807,664 A | 2/1989 | Wilson |
| 4,813,495 A | 3/1989 | Leach |
| 4,821,737 A | 4/1989 | Nelson |
| 4,826,403 A | 5/1989 | Catlow |
| 4,830,331 A | 5/1989 | Vindum |
| 4,832,709 A | 5/1989 | Nagyszalanczy |
| 4,904,284 A | 2/1990 | Hanabusa |
| 4,984,830 A | 1/1991 | Saunders |
| 5,007,328 A | 4/1991 | Otteman |
| 5,024,585 A | 6/1991 | Kralovec |
| 5,043,617 A | 8/1991 | Rostron |
| 5,044,701 A | 9/1991 | Watanabe |
| 5,045,046 A | 9/1991 | Bond |
| 5,054,995 A | 10/1991 | Kaseley |
| 5,064,452 A | 11/1991 | Yano |
| 5,080,137 A | 1/1992 | Adams |
| 5,163,895 A | 11/1992 | Titus |
| 5,190,440 A | 3/1993 | Maier |
| 5,202,024 A | 4/1993 | Andersson |
| 5,202,026 A | 4/1993 | Lema |
| 5,203,891 A | 4/1993 | Lema |
| 5,207,810 A | 5/1993 | Sheth |
| 5,211,427 A | 5/1993 | Washizu |
| 5,244,479 A | 9/1993 | Dean, II |
| 5,246,346 A | 9/1993 | Schiesser |
| 5,280,766 A | 1/1994 | Mohn |
| 5,285,123 A | 2/1994 | Kataoka |
| 5,306,051 A | 4/1994 | Loker |
| 5,337,779 A | 8/1994 | Fukuhara |
| 5,378,121 A | 1/1995 | Hackett |
| 5,382,141 A | 1/1995 | Stinessen |
| 5,385,446 A | 1/1995 | Hays |
| 5,412,977 A | 5/1995 | Schmohl |
| 5,421,708 A | 6/1995 | Utter |
| 5,443,581 A | 8/1995 | Malone |
| 5,464,536 A | 11/1995 | Rogers |
| 5,484,521 A | 1/1996 | Kramer |
| 5,496,394 A | 3/1996 | Nied |
| 5,500,039 A | 3/1996 | Mori |
| 5,525,034 A | 6/1996 | Hays |
| 5,525,146 A | 6/1996 | Straub |
| 5,531,811 A | 7/1996 | Kloberdanz |
| 5,538,259 A | 7/1996 | Uhmer |
| 5,542,831 A | 8/1996 | Scarfone |
| 5,575,309 A | 11/1996 | Connell |
| 5,575,615 A | 11/1996 | Mohn |
| 5,585,000 A | 12/1996 | Sassi |

(56) References Cited

U.S. PATENT DOCUMENTS

| | | |
|---|---|---|
| 5,605,172 A | 2/1997 | Schubert |
| 5,622,621 A | 4/1997 | Kramer |
| 5,628,623 A | 5/1997 | Skaggs |
| 5,634,492 A | 6/1997 | Steinruck |
| 5,640,472 A | 6/1997 | Meinzer |
| 5,641,280 A | 6/1997 | Timuska |
| 5,653,347 A | 8/1997 | Larsson |
| 5,664,420 A | 9/1997 | Hays |
| 5,682,759 A | 11/1997 | Hays |
| 5,683,235 A | 11/1997 | Welch |
| 5,685,691 A | 11/1997 | Hays |
| 5,687,249 A | 11/1997 | Kato |
| 5,693,125 A | 12/1997 | Dean |
| 5,703,424 A | 12/1997 | Dorman |
| 5,709,528 A | 1/1998 | Hablanian |
| 5,713,720 A | 2/1998 | Barhoum |
| 5,720,799 A | 2/1998 | Hays |
| 5,749,391 A | 5/1998 | Loutzenhiser |
| 5,750,040 A | 5/1998 | Hays |
| 5,775,882 A | 7/1998 | Kiyokawa |
| 5,779,619 A | 7/1998 | Borgstrom |
| 5,795,135 A | 8/1998 | Nyilas |
| 5,800,092 A | 9/1998 | Nill |
| 5,848,616 A | 12/1998 | Vogel |
| 5,850,857 A | 12/1998 | Simpson |
| 5,853,585 A | 12/1998 | Nesseth |
| 5,861,052 A | 1/1999 | Meinander |
| 5,863,023 A | 1/1999 | Evans |
| 5,899,435 A | 5/1999 | Mitsch |
| 5,935,053 A | 8/1999 | Strid |
| 5,938,803 A | 8/1999 | Dries |
| 5,938,819 A | 8/1999 | Seery |
| 5,946,915 A | 9/1999 | Hays |
| 5,951,066 A | 9/1999 | Lane |
| 5,965,022 A | 10/1999 | Gould |
| 5,967,746 A | 10/1999 | Hagi |
| 5,971,702 A | 10/1999 | Afton |
| 5,971,907 A | 10/1999 | Johannemann |
| 5,980,218 A | 11/1999 | Takahashi |
| 5,988,524 A | 11/1999 | Odajima |
| 6,027,311 A | 2/2000 | Hill |
| 6,035,934 A | 3/2000 | Stevenson |
| 6,059,539 A | 5/2000 | Nyilas |
| 6,068,447 A | 5/2000 | Foege |
| 6,090,174 A | 7/2000 | Douma |
| 6,090,299 A | 7/2000 | Hays |
| 6,113,675 A | 9/2000 | Branstetter |
| 6,122,915 A | 9/2000 | Hays |
| 6,123,363 A | 9/2000 | Burgard |
| 6,145,844 A | 11/2000 | Waggott |
| 6,149,825 A | 11/2000 | Gargas |
| 6,151,881 A | 11/2000 | Ai |
| 6,187,208 B1 | 2/2001 | White |
| 6,196,962 B1 | 3/2001 | Purvey |
| 6,206,202 B1 | 3/2001 | Galk |
| 6,214,075 B1 | 4/2001 | Filges |
| 6,217,637 B1 | 4/2001 | Toney |
| 6,227,379 B1 | 5/2001 | Nesseth |
| 6,277,278 B1 | 8/2001 | Conrad |
| 6,312,021 B1 | 11/2001 | Thomas |
| 6,314,738 B1 | 11/2001 | Hays |
| 6,372,006 B1 | 4/2002 | Pregenzer |
| 6,375,437 B1 | 4/2002 | Nolan |
| 6,383,262 B1 | 5/2002 | Marthinsen |
| 6,394,764 B1 | 5/2002 | Samurin |
| 6,398,973 B1 | 6/2002 | Saunders |
| 6,402,465 B1 | 6/2002 | Maier |
| 6,426,010 B1 | 7/2002 | Lecoffre |
| 6,464,469 B1 | 10/2002 | Grob |
| 6,467,988 B1 | 10/2002 | Czachor |
| 6,468,426 B1 | 10/2002 | Klass |
| 6,485,536 B1 | 11/2002 | Masters |
| 6,530,484 B1 | 3/2003 | Bosman |
| 6,530,979 B2 | 3/2003 | Firey |
| 6,531,066 B1 | 3/2003 | Saunders |
| 6,537,035 B2 | 3/2003 | Shumway |
| 6,540,917 B1 | 4/2003 | Rachels |
| 6,547,037 B2 | 4/2003 | Kuzdzal |
| 6,592,654 B2 | 7/2003 | Brown |
| 6,596,046 B2 | 7/2003 | Conrad |
| 6,599,086 B2 | 7/2003 | Soja |
| 6,607,348 B2 | 8/2003 | Jean |
| 6,616,719 B1 | 9/2003 | Sun |
| 6,617,731 B1 | 9/2003 | Goodnick |
| 6,629,825 B2 | 10/2003 | Stickland |
| 6,631,617 B1 | 10/2003 | Dreiman |
| 6,658,986 B2 | 12/2003 | Pitla |
| 6,659,143 B1 | 12/2003 | Taylor |
| 6,669,845 B2 | 12/2003 | Klass |
| 6,688,802 B2 | 2/2004 | Ross |
| 6,707,200 B2 | 3/2004 | Carroll et al. |
| 6,718,955 B1 | 4/2004 | Knight |
| 6,719,830 B2 | 4/2004 | Illingworth |
| 6,764,284 B2 | 7/2004 | Oehman |
| 6,776,812 B2 | 8/2004 | Komura et al. |
| 6,802,693 B2 | 10/2004 | Reinfeld |
| 6,802,881 B2 | 10/2004 | Illingworth |
| 6,811,713 B2 | 11/2004 | Arnaud |
| 6,817,846 B2 | 11/2004 | Bennitt |
| 6,827,974 B2 | 12/2004 | Nelson |
| 6,837,913 B2 | 1/2005 | Schilling |
| 6,843,836 B2 | 1/2005 | Kitchener |
| 6,878,187 B1 | 4/2005 | Hays et al. |
| 6,893,208 B2 | 5/2005 | Frosini |
| 6,907,933 B2 | 6/2005 | Choi |
| 6,979,358 B2 | 12/2005 | Ekker |
| 7,000,893 B2 | 2/2006 | Yakushi |
| 7,001,448 B1 | 2/2006 | West |
| 7,013,978 B2 | 3/2006 | Appleford |
| 7,022,150 B2 | 4/2006 | Borgstrom |
| 7,022,153 B2 | 4/2006 | McKenzie |
| 7,025,890 B2 | 4/2006 | Moya |
| 7,033,410 B2 | 4/2006 | Hilpert |
| 7,033,411 B2 | 4/2006 | Carlsson |
| 7,056,363 B2 | 6/2006 | Carlsson |
| 7,063,465 B1 | 6/2006 | Wilkes |
| 7,112,036 B2 | 9/2006 | Lubell |
| 7,131,292 B2 | 11/2006 | Ikegami |
| 7,144,226 B2 | 12/2006 | Pugnet |
| 7,159,723 B2 | 1/2007 | Hilpert |
| 7,160,518 B2 | 1/2007 | Chen |
| 7,169,305 B2 | 1/2007 | Gomez |
| 7,185,447 B2 | 3/2007 | Arbeiter |
| 7,204,241 B2 | 4/2007 | Thompson |
| 7,241,392 B2 | 7/2007 | Maier |
| 7,244,111 B2 | 7/2007 | Suter |
| 7,258,713 B2 | 8/2007 | Eubank |
| 7,270,145 B2 | 9/2007 | Koezler |
| 7,288,139 B1 | 10/2007 | Showalter |
| 7,288,202 B2 | 10/2007 | Maier |
| 7,314,560 B2 | 1/2008 | Yoshida |
| 7,323,023 B2 | 1/2008 | Michele |
| 7,328,749 B2 | 2/2008 | Reitz |
| 7,335,313 B2 | 2/2008 | Moya |
| 7,377,110 B2 | 5/2008 | Sheridan |
| 7,381,235 B2 | 6/2008 | Koene |
| 7,396,373 B2 | 7/2008 | Lagerstedt |
| 7,399,412 B2 | 7/2008 | Keuschnigg |
| 7,435,290 B2 | 10/2008 | Lane |
| 7,445,653 B2 | 11/2008 | Trautmann |
| 7,470,299 B2 | 12/2008 | Han |
| 7,473,083 B2 | 1/2009 | Oh |
| 7,479,171 B2 | 1/2009 | Cho |
| 7,494,523 B2 | 2/2009 | Oh |
| 7,501,002 B2 | 3/2009 | Han |
| 7,520,210 B2 | 4/2009 | Theodore, Jr. |
| 7,575,422 B2 | 8/2009 | Bode |
| 7,578,863 B2 | 8/2009 | Becker |
| 7,591,882 B2 | 9/2009 | Harazim |
| 7,594,941 B2 | 9/2009 | Zheng |
| 7,594,942 B2 | 9/2009 | Polderman |
| 7,610,955 B2 | 11/2009 | Irwin |
| 7,628,836 B2 | 12/2009 | Barone |
| 7,637,699 B2 | 12/2009 | Albrecht |

(56) References Cited

U.S. PATENT DOCUMENTS

| | | |
|---|---|---|
| 7,674,377 B2 | 3/2010 | Carew |
| 7,677,308 B2 | 3/2010 | Kolle |
| 7,708,537 B2 | 5/2010 | Bhatia |
| 7,708,808 B1 | 5/2010 | Heumann |
| 7,744,663 B2 | 6/2010 | Wallace |
| 7,748,079 B2 | 7/2010 | McDowell |
| 7,766,989 B2 | 8/2010 | Lane |
| 7,811,344 B1 | 10/2010 | Duke |
| 7,811,347 B2 | 10/2010 | Carlsson |
| 7,815,415 B2 | 10/2010 | Kanezawa |
| 7,824,458 B2 | 11/2010 | Borgstrom |
| 7,824,459 B2 | 11/2010 | Borgstrom |
| 7,846,228 B1 | 12/2010 | Saaaki |
| 7,938,874 B2 | 5/2011 | Auber |
| 2001/0007283 A1 | 7/2001 | Johal |
| 2002/0009361 A1 | 1/2002 | Reichert |
| 2003/0029318 A1 | 2/2003 | Firey |
| 2003/0035718 A1 | 2/2003 | Langston |
| 2003/0136094 A1 | 7/2003 | Illingworth |
| 2003/0192718 A1 | 10/2003 | Buckman |
| 2004/0007261 A1 | 1/2004 | Cornwell |
| 2004/0170505 A1 | 9/2004 | Lenderink |
| 2005/0173337 A1 | 8/2005 | Costinel |
| 2005/0241178 A1 | 11/2005 | Arbeiter |
| 2006/0065609 A1 | 3/2006 | Arthur |
| 2006/0090430 A1 | 5/2006 | Trautman |
| 2006/0096933 A1 | 5/2006 | Maier |
| 2006/0157251 A1 | 7/2006 | Stinessen |
| 2006/0157406 A1 | 7/2006 | Maier |
| 2006/0193728 A1 | 8/2006 | Lindsey |
| 2006/0222515 A1 | 10/2006 | Delmotte |
| 2006/0230933 A1 | 10/2006 | Harazim |
| 2006/0239831 A1 | 10/2006 | Garris, Jr. |
| 2006/0254659 A1 | 11/2006 | Ballot |
| 2006/0275160 A1 | 12/2006 | Leu |
| 2007/0029091 A1 | 2/2007 | Stinessen |
| 2007/0036646 A1 | 2/2007 | Nguyen |
| 2007/0051245 A1 | 3/2007 | Yun |
| 2007/0062374 A1 | 3/2007 | Kolle |
| 2007/0065317 A1 | 3/2007 | Stock |
| 2007/0084340 A1 | 4/2007 | Dou |
| 2007/0140815 A1 | 6/2007 | Shinozaki |
| 2007/0140870 A1 | 6/2007 | Fukanuma |
| 2007/0151922 A1 | 7/2007 | Mian |
| 2007/0163215 A1 | 7/2007 | Lagerstadt |
| 2007/0172363 A1 | 7/2007 | Laboube |
| 2007/0196215 A1 | 8/2007 | Frosini |
| 2007/0227969 A1 | 10/2007 | Dehaene |
| 2007/0256398 A1 | 11/2007 | Barone |
| 2007/0294986 A1 | 12/2007 | Beetz |
| 2008/0031732 A1 | 2/2008 | Peer |
| 2008/0039732 A9 | 2/2008 | Bowman |
| 2008/0179261 A1 | 7/2008 | Patrovsky |
| 2008/0246281 A1 | 10/2008 | Agrawal |
| 2008/0315812 A1 | 12/2008 | Balboul |
| 2009/0013658 A1 | 1/2009 | Borgstrom |
| 2009/0015012 A1 | 1/2009 | Metzler |
| 2009/0025562 A1 | 1/2009 | Hallgren |
| 2009/0025563 A1 | 1/2009 | Borgstrom |
| 2009/0151928 A1 | 6/2009 | Lawson |
| 2009/0169407 A1 | 7/2009 | Yun |
| 2009/0173095 A1 | 7/2009 | Bhatia |
| 2009/0266231 A1 | 10/2009 | Franzen |
| 2009/0304496 A1 | 12/2009 | Maier |
| 2009/0321343 A1 | 12/2009 | Maier |
| 2009/0324391 A1 | 12/2009 | Maier |
| 2010/0007133 A1 | 1/2010 | Maier |
| 2010/0021292 A1 | 1/2010 | Maier |
| 2010/0038309 A1 | 2/2010 | Maier |
| 2010/0043288 A1 | 2/2010 | Wallace |
| 2010/0043364 A1 | 2/2010 | Curien |
| 2010/0044966 A1 | 2/2010 | Majot |
| 2010/0072121 A1 | 3/2010 | Maier |
| 2010/0074768 A1 | 3/2010 | Maier |
| 2010/0083690 A1 | 4/2010 | Sato |
| 2010/0090087 A1 | 4/2010 | Maier |
| 2010/0139776 A1 | 6/2010 | Auber |
| 2010/0143172 A1 | 6/2010 | Sato |
| 2010/0163232 A1 | 7/2010 | Kolle |
| 2010/0183438 A1 | 7/2010 | Maier |
| 2010/0239419 A1 | 9/2010 | Maier |
| 2010/0239437 A1 | 9/2010 | Maier |
| 2010/0247299 A1 | 9/2010 | Maier |
| 2010/0257827 A1 | 10/2010 | Lane |
| 2011/0017307 A1 | 1/2011 | Kidd |
| 2011/0061536 A1 | 3/2011 | Maier |

FOREIGN PATENT DOCUMENTS

| | | |
|---|---|---|
| CA | 2578262 | 9/2005 |
| CA | 2647511 | 10/2007 |
| DE | 1024439 B | 2/1958 |
| EP | 0150599 | 8/1985 |
| EP | 301285 | 10/1991 |
| EP | 561065 | 11/1991 |
| EP | 552837 | 1/1993 |
| EP | 1582703 | 10/2005 |
| EP | 2013479 | 1/2009 |
| EP | 2063975 | 6/2009 |
| EP | 2233745 | 9/2010 |
| EP | 2322282 | 5/2011 |
| EP | 1796808 | 7/2011 |
| GB | 417373 | 10/1934 |
| GB | 1192354 | 5/1970 |
| GB | 1512381 | 6/1978 |
| GB | 2323639 | 9/1998 |
| GB | 2337561 | 11/1999 |
| GB | 2477699 | 8/2011 |
| JP | 54099206 | 1/1978 |
| JP | 80 68501 | 3/1996 |
| JP | 8-284961 A | 11/1996 |
| JP | 2002 242699 | 8/2002 |
| JP | 3711028 | 10/2005 |
| JP | 2005291202 | 10/2005 |
| KR | 2009085521 | 2/2008 |
| MX | 2008012579 | 12/2008 |
| WO | WO9524563 | 9/1995 |
| WO | WO9619276 | 6/1996 |
| WO | WO0074811 | 12/2000 |
| WO | WO0117096 | 3/2001 |
| WO | WO2005003512 | 1/2005 |
| WO | WO2006029413 | 3/2006 |
| WO | WO2006053088 | 5/2006 |
| WO | WO2007043889 | 4/2007 |
| WO | WO2007103248 | 9/2007 |
| WO | WO2007120506 | 10/2007 |
| WO | WO2008036221 | 3/2008 |
| WO | WO2008039446 | 3/2008 |
| WO | WO2008039491 | 4/2008 |
| WO | WO2008039731 | 4/2008 |
| WO | WO2008039732 | 4/2008 |
| WO | WO2008039733 | 4/2008 |
| WO | WO2008039734 | 4/2008 |
| WO | WO2008036394 | 7/2008 |
| WO | WO2009111616 | 9/2009 |
| WO | WO2009158252 | 12/2009 |
| WO | WO2009158253 | 12/2009 |
| WO | WO2010065303 | 6/2010 |
| WO | WO2010083416 | 7/2010 |
| WO | WO2010083427 | 7/2010 |
| WO | WO2010107579 | 9/2010 |
| WO | WO2010110992 | 9/2010 |
| WO | WO2011034764 | 3/2011 |
| WO | WO2011100158 | 8/2011 |
| WO | WO2012009158 | 1/2012 |
| WO | WO2012009159 | 1/2012 |
| WO | WO2012012143 | 1/2012 |
| WO | WO2012033632 | 3/2012 |

OTHER PUBLICATIONS

Tri-Phase Rotary Separator Turbine, Multiphase Power & Processing Technologies LLC Technical Literature (available at http://www/mpptech.com/techpp/pdfs/Tri-Phase.pdf).

(56) References Cited

OTHER PUBLICATIONS

IRIS™ In-Line Rotary Separator/Scrubber, Multiphase Power & Processing Technologies LLC Technical Literature (available at http://www.mpptech.com/products/IRIS_Rev5.2PDF).
Testing of an In-Line Rotary Separator (IRIS™) at the Chevron F. Ramirez Gas Production Facility by Hank Rawlins and Frank Ting, Presented at 52nd Annual Laurence Reid Gas Conditioning Conference, The University of Oklahoma, Feb. 24-27, 2002.
Utilization of Inline Rotary Separator as a Wet Gas Meter by V.C. Ting Presented at the 19th North Sea Flow Measurement Workshop 2001.
Analysis of Results of a Rotary Separator Rubine on the Shell Ram-Powell TLP by Greg Ross, Keith Oxley and Hank Rowlins.
Field Test Results of a Rotary Separator Turbine on the Ram/Powell TLP by C.H. Rawlins and G.D. Ross, presented at the 2001 Offshore Technology Conference in Houston, Texas 4-30-5-3, 2001.
Two-Phase Flow Turbines in Oil and Gas Production and Processing by Geirmund Vislie and Simon RH Davies.
Further Developments of the Biphase Rotary Separator Turbine by Geirmund Vislie, Simon Davies and Lance Hays.
"Technical Manual—High Pessure Air Compressor Model 13NL45", Navsea S6220-AT-MMA-010/93236, Oct. 28, 1991, pp. 3-23 to 3-32, Electric Boat Corporation, Groton, CT 06340.
EP05796401—Supplementary European Search Report mailed Aug. 26, 2008.
EP10196474—European Search Report mailed Mar. 21, 2011.
PCT/GB95/00193 Notification of International Search Report mailed Jun. 2, 1995.
PCT/FI00/00496—International Search Report mailed Oct. 16, 2000.
PCT/US2005/032556—Notification of International Preliminary Report on Patentability mailed Mar. 13, 2007.
PCT/US2005/032556—Notification of International Search Report and Written Opinion mailed Oct. 18, 2006.
PCT/US2005/040664—Notification of International Search Report and Written Opinion mailed. Oct. 17, 2006.
PCT/NO2006/000341—International Search Report mailed Jan. 11, 2007.
PCT/US2007/008149—International Preliminary Report on Patentability dated Sep. 30, 2008.
PCT/US2007/008149—Written Opinion dated Jul. 17, 2008.
PCT/US2007/020101—International Preliminary Report on Patentability dated Apr. 2, 2009.
PCT/US2007/020101—International Search Report dated Apr. 29, 2008.
PCT/US2007/020471—International Preliminary Report on Patentability dated Apr. 2, 2009.
PCT/US2007/020471—International Search Report and Written Opinion dated Apr. 1, 2008.
PCT/US2007/020659—International Preliminary Report on Patentability dated Mar. 31, 2009.
PCT/US2007/020659—International Search Report and Written Opinion dated Sep. 17, 2008.
PCT/US2007/020768—International Preliminary Report on Patentability dated Apr. 9, 2009.
PCT/US2007/020768—International Search Report and Written Opinion dated Mar. 3, 2008.
PCT/US2007/079348—International Preliminary Report on Patentability dated Apr. 9, 2009.
PCT/US2007/079348—International Search Report dated Apr. 11, 2008.
PCT/US2007/079348—Written Opinion mailed Apr. 11, 2008.
PCT/US2007/079349—International Preliminary Report on Patentability dated Mar. 31, 2009.
PCT/US2007/079349—International Search Report and Written Opinion dated Apr. 2, 2008.
PCT/US2007/079350—International Preliminary Report on Patentability mailed Apr. 9, 2009.
PCT/US2007/079350—International Search Report mailed Apr. 2, 2008.
PCT/US2007/079350—Written Opinion mailed Apr. 2, 2008.
PCT/US2007/079352—International Preliminary Report on Patentability dated Apr. 9, 2009.
PCT/US2007/079352—International Search Report and Written Opinion dated Aug. 27, 2008.
PCT/US2009/036142—International Preliminary Report on Patentability dated Sep. 16, 2010.
PCT/US2009/036142—International Search Report mailed May 11, 2009.
PCT/US2009/036142—Written Opinion dated May 11, 2009.
PCT/US2009/047662—International Preliminary Report on Patentability dated Jan. 13, 2011.
PCT/US2009/047662—Written Opinion dated Aug. 20, 2009.
PCT/US2009/064916—Notification of International Preliminary Report on Patentability mailed Jun. 16, 2011.
PCT/US2009/064916—Notification of International Search Report and Written Opinion mailed Jan. 25, 2010.
PCT/US2010/021199—International Preliminary Report on Patentability dated Mar. 29, 2011.
PCT/US2010/021199—International Search Report and Written Opinion dated Mar. 22, 2010.
PCT/US2010/021218—International Report on Patentability dated Feb. 2, 2011.
PCT/US2010/021218—International Search Report and Written Opinion dated Mar. 23, 2010.
PCT/US2010/025650—International Report on Patentability dated Mar. 14, 2011.
PCT/US2010/025650—International Search Report and Written Opinion dated Apr. 22, 2010.
PCT/US2010/025952—International Report on Patentability dated Mar. 14, 2011.
PCT/US2010/025952—International Search Report and Written Opinion dated Apr. 12, 2010.
PCT/US2011/023593—Notification of International Search Report and Written Opinion dated Oct. 18, 2011.
PCT/US2011/037112—Notification of International Search Report and Written Opinion mailed Jan. 13, 2012.
PCT/US2011/042205—Notification of International Search Report and Written Opinion mailed Feb. 21, 2012.
PCT/US2011/042209—International Search Report mailed Feb. 24, 2012.
PCT/US2011/042227—Notification of International Search Report dated Feb. 21, 2012.
PCT/US2011/048652—Notification of International Search Report and Written Opinion mailed Jan. 9, 2012.

ENHANCED IN-LINE ROTARY SEPARATOR

CROSS-REFERENCE TO RELATED APPLICATIONS

The present application is a national stage application of PCT Pat. App. No. PCT/US2011/042205, filed Jun. 28, 2011, claims priority to U.S. Provisional Patent Application having Ser. No. 61/364,669, which was filed Jul. 15, 2010. These priority applications are incorporated herein in their entirety, to the extent consistent with the present application.

BACKGROUND

Separators for separating components of a fluid flow based on density are used in various industrial applications. One type of separator is known as a rotary separator because it includes a rotating element, often referred to as a "drum," that centrifuges higher-density elements of the fluid, such as liquid, from lower-density elements, such as gas. Rotary separators can be positioned "in-line," meaning they are coupled on both the inlet and outlet ends to a hydrocarbon or other type of pipeline. Rotary separators, including in-line rotary separators, can also be attached to various other components, for example, compressors, other separators, and scrubbers. For example, rotary separators can be coupled to static separators (e.g., upstream from the rotary separator) and compressors (e.g., downstream from the rotary separator). The advantages of separating (e.g., "drying") the fluid prior to compressing or otherwise handling the fluid include increased device efficiency downstream, which can allow for greater flow rates, higher compression ratios, or both. Additionally, drying the fluid prior to introducing it to a compressor can avoid unnecessary wear on the compressor components.

Rotary separators, including in-line rotary separators, can be driven to rotate by suitable drivers or can be "self-driven," converting some of the potential energy stored in the pressure of the fluid flow into rotational kinetic energy. Driven separators typically include a rotatable shaft connected to a drum. The shaft is rotated by the driver, which in turn rotates the drum. When fluid flow enters the drum, the rotating drum applies a higher inertial force on the higher-density components of the fluid, propelling the higher-density components toward the outside of the flow where they can be collected. In self-driven separators, the fluid is generally directed through stationary nozzles and/or vanes positioned at the inlet of the drum to create a high-velocity swirling flow. The swirling flow rotates the drum, as opposed to the external driver, causing inertial separation similar to that of driven rotary separators.

Although suitably sized and configured in-line rotary separators perform well in a variety of applications, there remains a need for in-line rotary separators with increased separation efficiencies, which allows for higher flow rates, smaller-sized separators, better separation, lower pressure-drops, and/or combinations thereof.

SUMMARY

Embodiments of the disclosure may provide an exemplary apparatus for separating a fluid. The exemplary apparatus may include a rotatable drum having an inner drum wall and an outer drum wall disposed around the inner drum wall to define a separation passage therebetween. The exemplary apparatus may also include radial separator blades that are curved in a circumferential direction and are disposed in the separation passage of the drum, the radial separator blades extending radially at least partially between the inner drum wall and the outer drum wall. The exemplary apparatus may further include a first circumferential separator blade that is curved in a radial direction and is disposed in the separation passage of the drum, the first circumferential separator blade extending at least partially around the inner drum wall. The exemplary apparatus may also include a housing disposed around the drum and configured to receive a higher-density component of the fluid separated in the separation passage.

Embodiments of the disclosure may further provide an exemplary method for separating a fluid. The exemplary method may include introducing the fluid into a separation passage defined in a drum, and rotating the drum to partially separate a higher-density component of the fluid from a lower-density component thereof. The exemplary method may further include turning the fluid in the separation passage to further separate the higher-density component of the fluid from the lower-density component thereof, which may include turning the fluid in a first circumferential direction using curved radial separator blades, and turning the fluid in a first radial direction using a curved circumferential separator blade.

Embodiments of the disclosure may also provide an exemplary rotary separator. The exemplary rotary separator may include a drum having an inner drum wall and an outer drum wall that is separated from the inner drum wall to at least partially define a separation passage therebetween, the drum being configured to rotate to separate a liquid from a gas in a multiphase fluid. The exemplary rotary separator may also include a row of radial separator blades disposed proximal an axial middle of the drum, the radial separator blades extending from the inner drum wall to the outer drum wall and being curved so as to turn fluid flowing therepast in a first and second circumferential direction, each radial separator blade defining a radially-extending drainage groove. The exemplary rotary separator may further include first and second circumferential separator blades disposed in the separation passage, proximal the axial middle of the drum, and extending at least partially around the inner drum wall, the first and second circumferential separator blades being curved so as to turn fluid flowing therebetween in a first and second radial direction, the first and second circumferential separator blades each defining drainage ports therein, each drainage port being aligned with the drainage groove of at least one of the radial separator blades. The exemplary rotary separator may also include a housing disposed around the rotatable drum and defining a collection chamber in fluid communication with the separation passage. The exemplary rotary separator may further include a swirling structure disposed proximal an upstream end of the drum and configured to swirl the fluid to rotate the drum.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
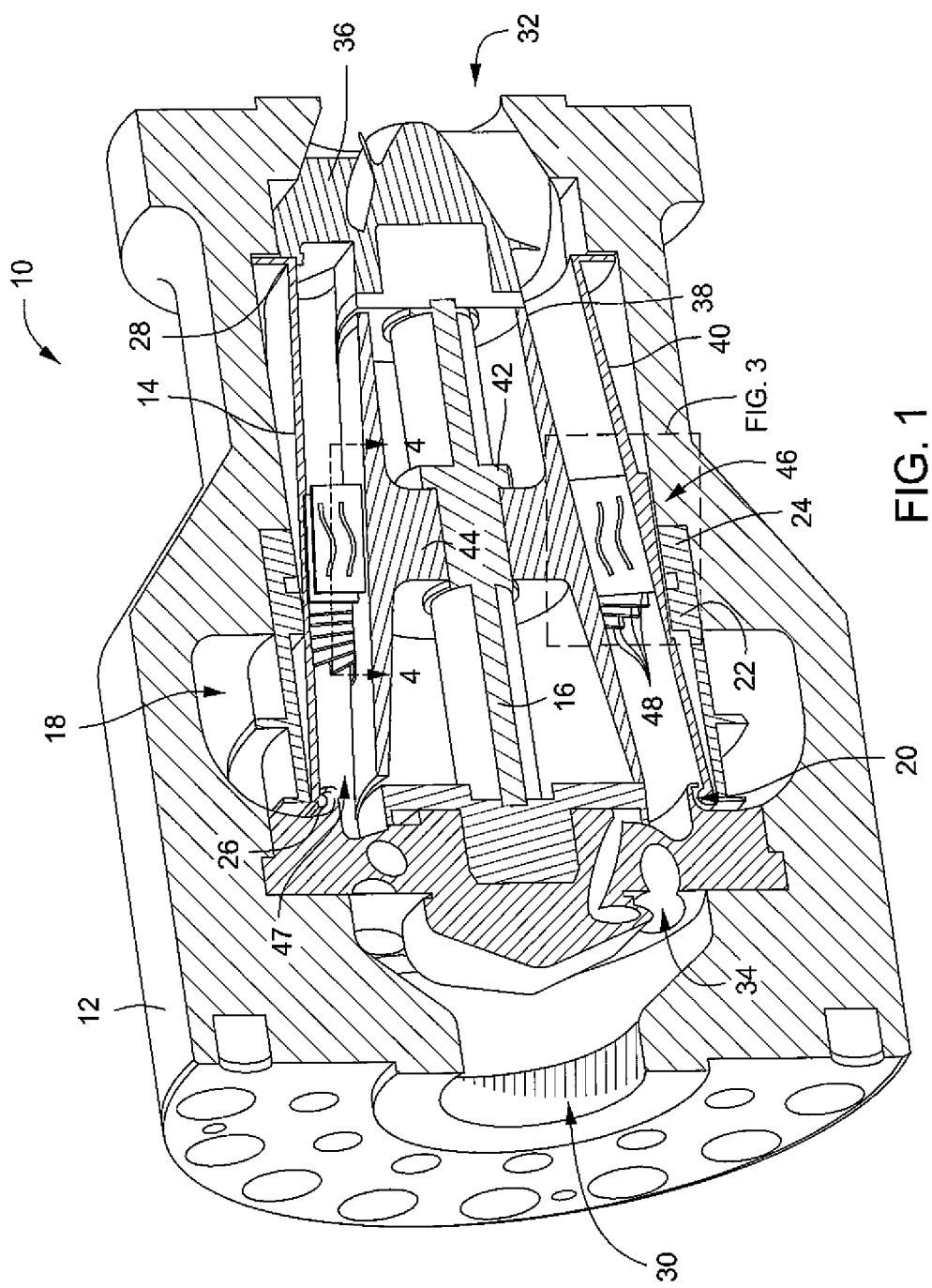
FIG. 1 illustrates a cut-away, perspective view of an exemplary rotary separator, in accordance with one or more aspects of the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the at least one embodiment and across the Figures provided herein. This repetition is for the purpose of simplicity and clarity and does not in itself dictate a relationship between the at least one embodiment and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a cut-away, perspective view of a rotary separator 10, according to an embodiment described. The rotary separator 10 generally includes a housing 12 with a rotatable drum 14 disposed therein. The drum 14 may be supported by a shaft 16 that may rotate or remain stationary. In an embodiment, the housing 12 includes a generally toroidal collection chamber 18 defined therein and positioned around the drum 14. Although not shown, a drain may be attached to the housing 12 and may be in fluid communication with the collection chamber 18. The collection chamber 18 may be in fluid communication with the drum 14 via an outlet passage 20 formed between the housing 12 and the drum 14, to allow separated fluid components to exit the drum 14, as will be described in greater detail below. In other embodiments, however, slits, openings, apertures, or the like may be defined in the housing 12 to allow separated fluid to exit the collection chamber 18. Additionally, one or more seals (two are shown: 22 and 24), which may be labyrinth seals, brush seals, dry gas seals, or the like, may be disposed between the drum 14 and the housing 12 to ensure fluids flow from the drum 14 to the collection chamber 18 and are not lost between the drum 14 and the housing 12.

The drum 14 has an upstream end 26 and a downstream end 28. An inlet channel 30 is defined in the housing 12, upstream from the upstream end 26, and an outlet or diffuser channel 32 is defined in the housing 12, downstream from the downstream end 28. In other exemplary embodiments, however, the inlet and diffuser channels 30, 32 may be defined at other positions in the housing 12. A plurality of swirling structures 34 may be disposed in the inlet channel 30, proximal the upstream end 26. In at least one embodiment, the swirling structures 34 may be or include nozzles, as shown, stationary or rotating vanes, or the like. Further, a plurality of de-swirling structures 36 may be disposed in the diffuser channel 32, proximal the downstream end 28. In various embodiments, the de-swirling structures 36 may be or include stationary vanes, as shown, rotating vanes, nozzles, or the like. In an embodiment, the swirling and de-swirling structures 34, 36 may be omitted when swirling is not required, such as in a driven embodiment of the rotary separator 10.

The drum 14 includes an inner drum wall 38 and an outer drum wall 40. The inner drum wall 38 may be connected to the shaft 16 via a bearing 42 and/or a disk 44, which may be integral with or attached to the inner drum wall 38. In an embodiment, the bearing 42 may be or include an active magnetic bearing and/or any other type of suitable bearing. As shown, the inner and outer drum walls 38, 40 are spaced radially apart and may be disposed concentrically, or at least substantially so, around the shaft 16. In other embodiments, however, the inner and outer drum walls 38, 40 may be eccentric. Further, the illustrated inner and outer drum walls 38, 40 have a decreasing radius proceeding from the upstream end 26 toward the downstream end 28 of the drum 14, and thus have a generally frustoconical shape. Accordingly, the outlet passage 20 is defined proximal the upstream end 26, i.e., the area of the outer drum wall 40 that is farthest away from the shaft 16. In other embodiments, the inner and outer drum walls 38, 40 may have other shapes; for example, each may have an area of increased radius at the axial middle thereof or proximal the downstream end 28. In such an embodiment, the outlet passage 20 is generally defined proximal the area of increased radius.

A generally annular separation passage 47 is defined radially between the inner and outer drum walls 38, 40 and axially between the upstream and downstream ends 26, 28. The separation passage 47 may extend from the upstream end 26 to the downstream end 28 and may fluidly communicate with the inlet channel 30 and the diffuser channel 32. In other embodiments, however, the separation passage 47 may extend partially between the upstream and downstream ends 26, 28 and/or may be in fluid communication with other structures and/or fluid passages.

Figure 2:
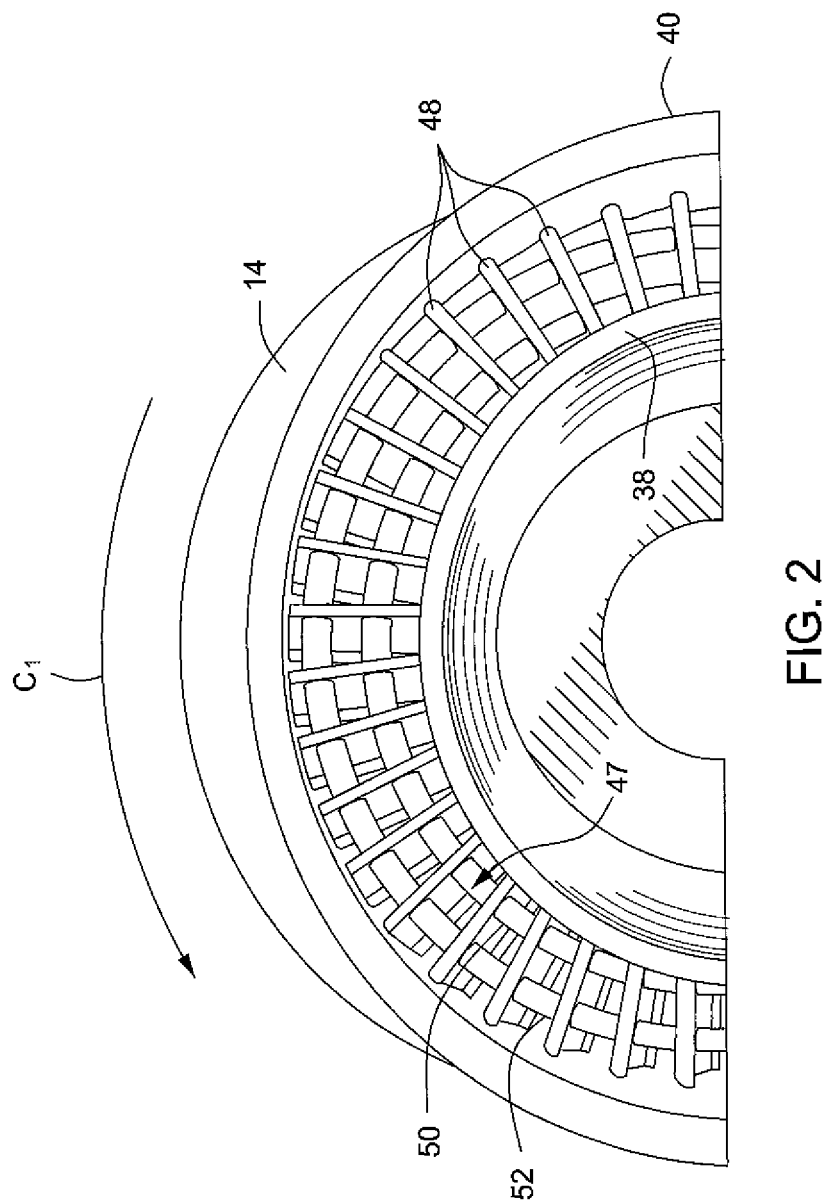
FIG. 2 illustrates an end view of an exemplary drum of the rotary separator of FIG. 1, in accordance with one or more aspects of the disclosure.

FIG. 2 illustrates an end view from upstream looking downstream at the drum 14 of FIG. 1. With continuing reference to FIG. 1, the drum 14 may include one or more rows 46 of radial separator blades 48. Each radial separator blade 48 may extend radially between and connect to the inner and outer drum walls 38, 40, traversing the separation passage 47 proximal the axial middle of the separation passage 47. Further, the radial separator blades 48 may have a relatively short axial length in comparison to the axial distance between the upstream end 26 and the downstream end 28 of the drum 14. In other embodiments, the radial separator blades 48 may have longer axial extents than shown, for example, extending about one-quarter, about one-third, about one-half or more of the axial length of the drum 14.

The radial separator blades 48 may be disposed closer to the upstream end 26 or closer to the downstream end 28 and may be disposed in rows, pairs, clusters, or other configurations. In an embodiment, the radial separator blades 48 extending between and connecting to the inner drum wall 38 and the outer drum wall 40 may provide structural support for the drum 14. In other embodiments, the outer drum wall 40 may be supported by radially-extending struts (not shown) and/or may be supported by the housing 12 using other structures (not shown). Further, one, some, or all of the radial separator blades 48 may connect to either the inner drum wall 38 or the outer drum wall 40 and extend partially through the separation passage 47. In another embodiment, the radial separator blades 48 may connect to neither the inner drum wall 38 nor the outer drum wall 40, and may be supported radially therebetween by other structures (not shown).

The first and second circumferential separator blades 50, 52 may be disposed at substantially the same axial location as the row 46 of radial separator blades 48. In other embodiments, however, the first and second circumferential separator blades 50, 52 may be disposed at other axial locations that may or may not coincide with the axial location(s) of the radial separator blades 48. The first and second circumferential separator blades 50, 52 may be generally concentric and radially offset from one another; however, in some embodiments the circumferential separator blades 50, 52 may be eccentric. The first and second circumferential separator blades 50, 52 may be of unitary construction and may be fit through apertures or slots formed in the radial separator blades 48. Further, the first and second circumferential separator blades 50, 52 may be formed from a piece of material that is inserted through apertures or slots defined circumferentially through the radial separator blades 48, with ends of the first and second circumferential separator blades 50, 52 welded, fastened, or otherwise fixed together to form a ring-shape. In other embodiments, the first and/or second circumferential separator blades 50, 52 may be segmented such that each segment extends between adjacent radial separator blades 48.

It will be appreciated that the illustrated embodiment having a single row 46 of radial separator blades 48 and two circumferential separator blades 50, 52 is merely one example among many contemplated herein. For example, additional rows 46 of radial separator blades 48 may be provided. In such embodiments, the radial separator blades 48 may be circumferentially aligned, staggered, or randomly oriented between the rows 46. Additionally, exemplary rotary separators 10 including additional or fewer circumferential separator blades 50, 52 are likewise contemplated herein. For example, in embodiments including additional rows 46 of radial separator blades 48, one, some, or all of the rows 46 of radial separator blades 48 may have first and second circumferential separator blades 50, 52, and/or additional circumferential separator blades disposed therethrough.

Figure 3:
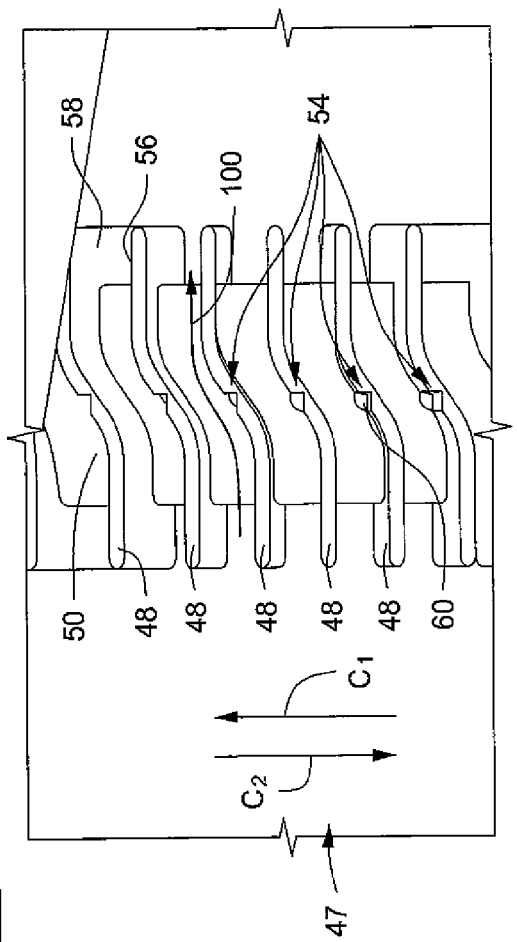
FIG. 3 illustrates an enlarged view of a portion of the rotary separator of FIG. 1, as indicated by the box labeled "FIG. 3" of FIG. 1.

FIG. 3 illustrates an enlarged view of a portion of the drum 14, as indicated in FIG. 1. The first and/or second circumferential separator blades 50, 52 are curved, for example, in one or more radial directions (i.e., radially-inward and/or radially-outward). As shown, a cross-section of each of the first and second circumferential separator blades 50, 52 may have a sine-wave shape. Various other shapes, alignments, and configurations of the first and second circumferential separator blades 50, 52 are contemplated and may be employed without departing from the scope of this disclosure. For example, the circumferential separator blades 50, 52 may be flat or may have a flattened "S"-shape, multiple curves, deeper curves than illustrated, angular corners, a plurality of bends, or the like.

Figure 4:
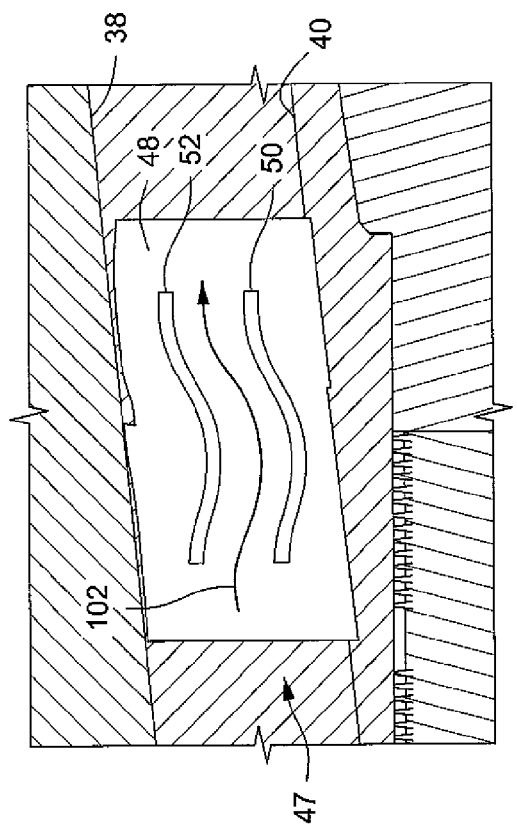
FIG. 4 illustrates an enlarged, sectional view of a portion of the rotary separator of FIG. 1, as indicated by line 4-4 of FIG. 1.

FIG. 4 illustrates another enlarged view of a portion of the drum 14, along line 4-4 of FIG. 1. In an embodiment, drainage ports 54 are defined extending radially through the first and second circumferential separator blades 50, 52, respectively. It will be appreciated that the drainage ports 54 may each be of any suitable shape, including aerofoil, as shown, or semi-circle, circular, rectangular, or the like. In an embodiment, each drainage port 54 is located proximal to one of the radial separator blades 48. Although not shown, multiple drainage ports 54, for example, axially-spaced drainage ports 54, may be defined in both of the first and second circumferential separator blades 50, 52.

One, some, or, as shown, all of the radial separator blades 48 may be curved in one or more circumferential directions (e.g., circumferential directions $C_1$ and/or $C_2$). As illustrated, a cross-section of the radial separator blades 48 may have a flattened "S"-shape. Various other shapes for the radial separator blades 48 are contemplated herein and may be employed without departing from the scope of this disclosure. For example, the radial separator blades 48 may be flat or may have a sine-wave shaped cross-section, multiple curves, deeper curves than illustrated, angular corners, a plurality of bends, or the like. Furthermore, in an embodiment, the cross-sectional shape of the radial separator blades 48 may be generally similar to or substantially the same as the cross-sectional shape of the circumferential separator blades 50, 52 described above. In other embodiments, the cross-sectional shapes of the radial separator blades 48 and the circumferential separator blades 50, 52 may differ.

The radial separator blades 48 may each have a leading surface 56 and a trailing surface 58. As noted above, the drum 14 may rotate in the first circumferential direction $C_1$; accordingly, during such rotation, the leading surface 56 precedes the trailing surface 58 of each radial separator blade 48 around the drum 14. One or more drainage grooves 60 may be defined in the leading surface 56 of each radial separator blades 48. With additional reference to FIG. 2, each drainage groove 60 may extend radially along each of the radial separator blades 48, for example, at least partially from the inner drum wall 38 to a drainage port 54 in the circumferential separator blade 50, from the drainage port 54 in the circumferential separator blade 50 to a drainage port 54 in the circumferential separator blade 52, and from the drainage port 54 in the circumferential separator blade 52 to the outer drum wall 40. In at least one embodiment, the drainage grooves 60 may be cuts defined in the radial separator blades 48, as shown, or may be enclosed conduits (not shown).

Figure 5:
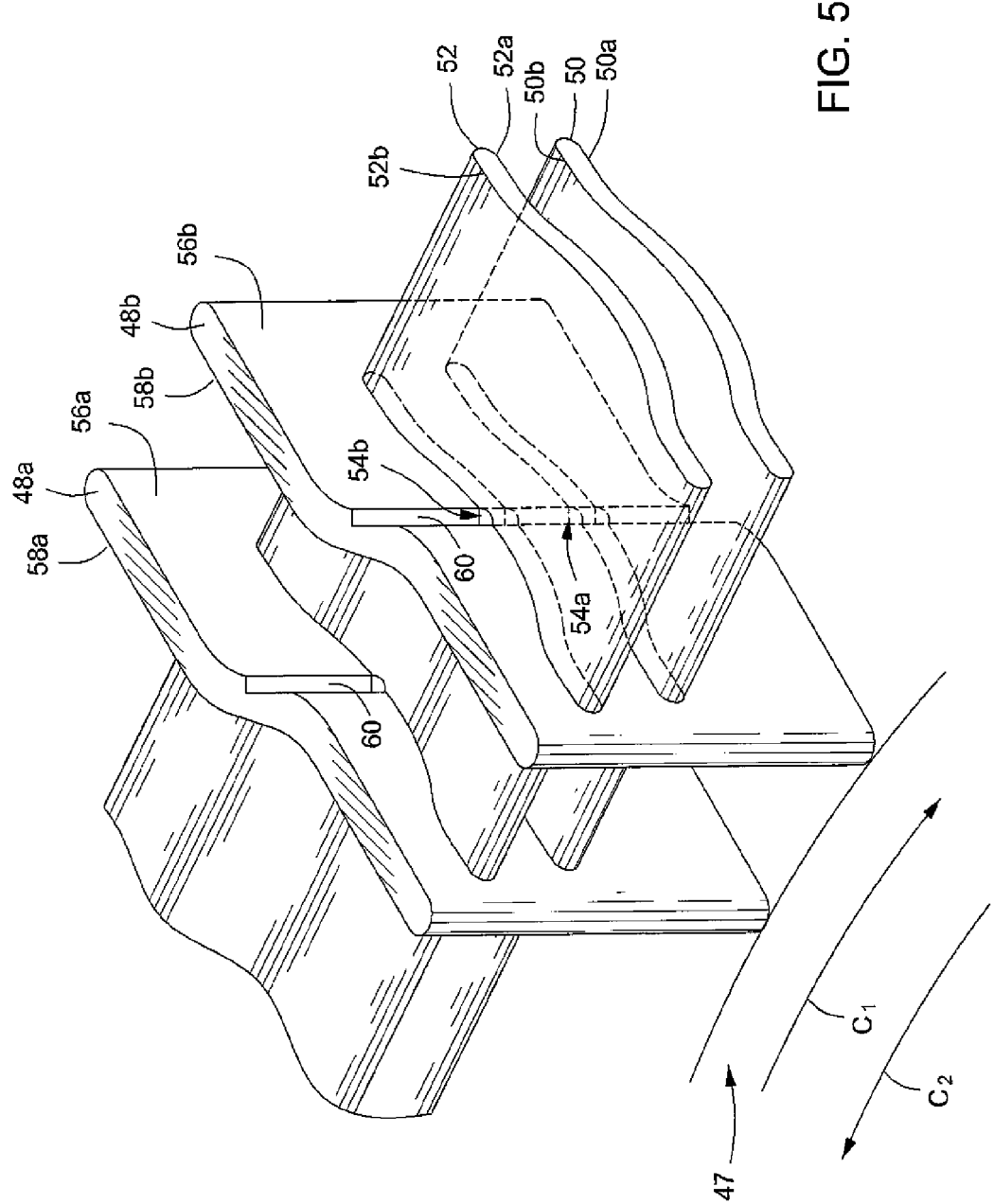
FIG. 5 illustrates a perspective view of exemplary radial separator vanes and exemplary circumferential separator blades, according to one or more aspects of the disclosure.

With continuing reference to FIG. 4, FIG. 5 illustrates a partial perspective view of exemplary first and second circumferential separator blades 50, 52 as well as an embodiment of two of the radial separator blades 48: first and second radial separator blades 48a, 48b. It will be appreciated that the remaining radial separator blades 48 may be repeating instances of the first and second radial separator blades 48a, 48b illustrated in FIG. 5 or may differ in various respects.

The first and second radial separator blades 48a,b are disposed in the separation passage 47, as also shown in FIG. 1, with both having circumferentially-opposing leading and trailing surfaces 56a,b and 58a,b, respectively. As shown, the trailing surface 58a of the first radial separator blade 48a follows the leading surface 56a thereof as the drum 14 rotates in the circumferential direction $C_1$. Further, the leading and trailing surfaces 56a, 58a of the first radial separator blade 48a may be, for example, congruent, although the leading and trailing surfaces 56a, 58a may instead have differing shapes. The leading and trailing surfaces 56b, 58b of the second radial separator blade 48b may be similarly positioned and/or shaped. In an embodiment, the distance between the trailing surface 58a of the first radial separator blade 48a and the leading surface 56b of the second radial separator blade 48b, i.e., the "pitch" of the first and second radial separator blades 48a,b, may be substantially constant despite curves defined in the first and second radial separator blades 48a,b.

The first and second circumferential separator blades 50, 52 each have an inside 50a, 52a, respectively, and an outside 50b, 52b, respectively. In an embodiment, the inside 50a and the outside 50b of the first circumferential separator blade 50 are congruent; however, in other embodiments, the shapes thereof may differ. Similarly, the inside 52a and outside 52b of the second circumferential separator blade 52 may be congruent in some embodiments, but in others they may differ in shape. Moreover, the inside 52a and outside 52b may be congruent to each other and to the inside 50a and the outside 50b, as shown. Additionally, the distance between the outside 50b of the first circumferential separator blade 50 and the inside 52a of the second circumferential separator blade 52, i.e., the "pitch" of the first and second circumferential separator blades 50, 52, may be substantially constant along the axial extent of the first and second circumferential separator blades 50, 52.

In an embodiment, a first drainage port 54a is defined radially through the first circumferential separator blade 50, proximal the leading surface 56b of the second radial separator blade 48b. The first drainage port 54a may extend between the inside 50a and the outside 50b of the first circumferential separator blade 50 to allow fluid communication therethrough. Similarly, a second drainage port 54b is defined through the second circumferential separator blade 52, proximal the leading surface 56b of the second radial separator blade 48b, and may be aligned with the drainage port 54a.

One of the drainage grooves 60 may be defined on the leading surface 56b of the second radial separator blade 52 and may extend from the inner drum wall 38 (FIGS. 1 and 3) to the drainage port 54a and therethrough. The drainage groove 60 may also extend from the drainage port 54a to the drainage port 54b and therethrough. The drainage groove 60 may also extend from the drainage port 54b to the outer drum wall 40. Some or all of the drainage grooves 60 may extend along each radial separator blade 48 as described; however, one or some of the drainage grooves 60 may extend partially as described and/or may extend in different directions.

Referring again to FIG. 1, in exemplary operation of the rotary separator 10, a fluid containing a higher-density component and a lower-density component, for example, a multiphase fluid such as a liquid-gas mixture (although single-phase mixed flows, or flows containing solids such as particulate matter may also be used), may be introduced via a conduit such as a pipeline (not shown) to the inlet channel 30. The inlet channel 30 increases the radius of the flow, thereby changing the cross-section of the flow from a generally circular shape to a generally annular shape. The flow may then proceed to the swirling structures 34 (when present), which alter the direction of the velocity field of the fluid flow, adding a circumferential component thereto. The swirled fluid then enters the separation passage 47 between the inner and outer drum walls 38, 40. The circumferentially-flowing fluid may engage the inner and outer drum walls 38, 40, applying a drag force thereto. The drum 14 may rotate in the circumferential direction $C_1$ in reaction to the drag force. In at least one embodiment, the drum 14 may instead or additionally be driven to rotate by an external driver (not shown).

The rotation of the drum 14 applies an inertial force on the fluid, proportional to the density thereof. Accordingly, a greater inertial force is applied to the higher-density component of the flow than is applied to the lower-density component. Thus, the higher-density component separates from the lower-density component and moves toward the outer drum wall 40 such that a layer of separated higher-density component may collect or otherwise coalesce on the outer drum wall 40.

Between the upstream and downstream ends 26, 28, and during the rotation of the drum 14, the fluid encounters the one or more rows 46 of radial separator blades 48 and/or the first and/or second circumferential separator blades 50, 52. The radial separator blades 48, as noted above, have circumferentially-extending curves; accordingly, the flowpath between each of the radial separator blades 48 is correspondingly curved. This curved geometry of the radial separator blades 48 causes the fluid flowing therepast to turn in the circumferential direction $C_1$ and/or in the opposite circumferential direction $C_2$, as illustrated by arrow 100 shown in FIG. 4. It will be appreciated that the turning may repeat in exemplary embodiments of the radial separator blades 48 having multiple curves. The circumferential separator blades 50, 52 cause the fluid flowing therepast to turn radially-outward and/or radially-inward, as illustrated by arrow 102 shown in FIG. 3. It will be appreciated that this turning may also repeat in exemplary embodiments of the circumferential separator blades 50, 52 having multiple curves. In an embodiment, the turning of the circumferential separator blades 50, 52 is substantially simultaneous to the turning caused by the radial separator blades 48.

Accordingly, in an embodiment, the fluid flowing past the radial separator blades 48 and the circumferential separator blades 50, 52 may be turned in both the radial and the circumferential planes simultaneously. Such turning applies a second inertial force on the fluid, proportional to the density thereof, which causes the higher-density components of the fluid to separate to the radial outside of the fluid in the turns. This causes at least a portion of the higher-density component to collect or otherwise coalesce on the leading and/or trailing surfaces 56, 58 of the radial separator vanes 48 and/or on the surfaces of the first and/or second circumferential separator blades 50, 52. The continued rotation of the drum 14 causes the separated higher-density component to move toward the drainage grooves 60 of the radial separator blades 48 and then through the drainage ports 54 and toward the outer drum wall 40. Once reaching the outer drum wall 40, the higher-density components separated by the radial separator blades 48 and/or the first and/or second circumferential separator blades 50, 52 may join with the higher-density components separated before or after the radial separator blades 48, and the first and second circumferential separator blades 50, 52 by the rotation of the drum 14.

The fluid continues through the separation passage 47, proceeding from the one or more rows 46 of radial separator blades 48 and the first and/or second circumferential separator blades 50, 52 to the downstream end 28 of the drum 14. Thereafter, the fluid may proceed to other pipeline sections and/or to various other components. In the illustrated embodiment, the radius of the inner and outer drum walls 38, 40 of the drum 14 decreases. Accordingly, any higher-density component that collects on the outer drum wall 40 during the fluid's traversal of the separation passage 47 moves toward the upstream end 26 as it is expelled farther radially-outward. Once reaching the upstream end 26, the higher-density component, as well as some of the lower-density component, for example, a small percentage thereof, may proceed into the outlet passage 20. The seals 22, 24 may ensure that a reduced amount, down to substantially none, of the fluid components travelling through the outlet passage 20 are lost around the outside of the outer drum wall 40, thus preventing re-entrainment of the separated components proximal the downstream end 28 of the drum 14.

Figure 6:
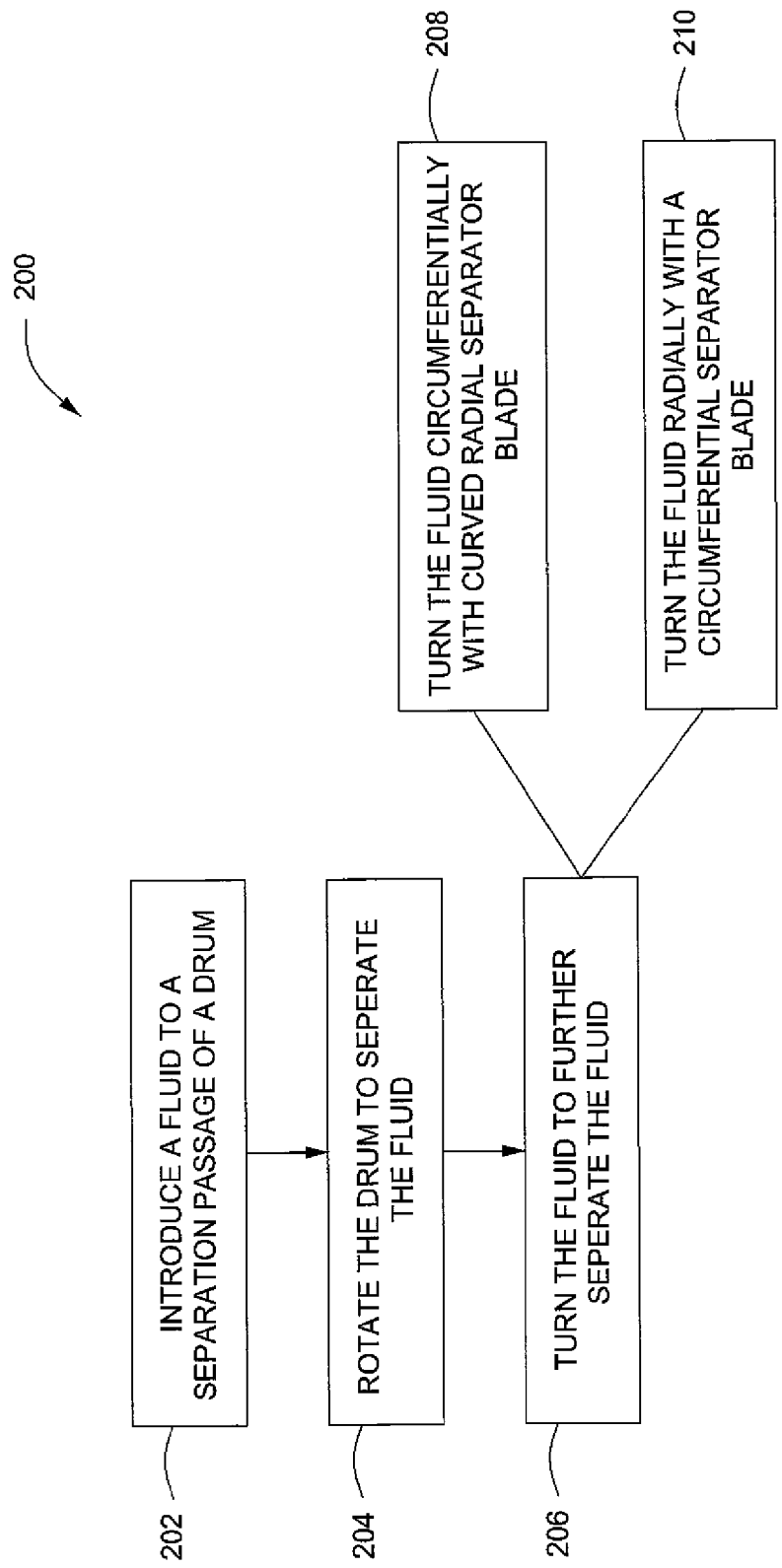
FIG. 6 illustrates a flowchart of an exemplary method for separating a fluid, according to one or more aspects of the disclosure.

FIG. 6 illustrates a flowchart of an exemplary method 200 for separating a fluid. In an embodiment, the method 200 may proceed by operation of the rotary separator 10 described above with reference to FIGS. 1-5 and thus may be best understood with reference thereto. The method 200 may begin by introducing the fluid into a separation passage defined in a drum, as at 202. This may also include swirling the fluid, such as in a "self-driven" rotary separator where the potential energy stored as pressure in the fluid flow is converted to kinetic energy rotating the rotary separator. In other embodiments, introducing the fluid as at 202 may omit swirling the fluid. The method 200 proceeds to rotating the drum to partially separate a higher-density component of the fluid from a lower-density component thereof, as at 204. In an embodiment, the higher-density component may be or include relatively high density liquids, solids, and/or gases and the lower-density component may be or include relatively low density liquids, solids, and/or gases. In one specific embodiment, the higher-density component may be liquid and the lower-density component may be gas.

The method 200 further includes turning the fluid in the separation passage to further separate the higher-density component of the fluid from the lower-density component thereof, as at 206. This turning induces "blade-to-blade" inertial separation as the fluid is turned. Accordingly, the turning as at 206 may include turning the fluid in a first circumferential direction and/or in a second, opposing circumferential direction using curved radial separator blades, as at 208. The turning as at 206 also includes turning the fluid in a first radial direction using one or more curved circumferential separator blade(s), as at 210. In at least one embodiment, the radial and/or circumferential separator blades may be curved multiple times, such that the turning at 208 and 210 is repeated. Furthermore, the radial and circumferential separator blades may be curved in various ways and shapes. Additionally, in at least one embodiment, the radial and/or circumferential separator blades may rotate along with the drum as a single unit. In an embodiment, the radial separator blades and the circumferential separator blade(s) may be disposed at a common axial location in the separation passage. Furthermore, in an embodiment, the method 200 may also include supporting the drum on a shaft with a magnetic bearing.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. An apparatus for separating a fluid, comprising:
 a rotatable drum having an inner drum wall and an outer drum wall disposed around the inner drum wall, the inner and outer drum walls at least partially defining a separation passage therebetween;
 radial separator blades curved in a circumferential direction and disposed in the separation passage of the drum, the radial separator blades extending radially at least partially between the inner drum wall and the outer drum wall;
 a first circumferential separator blade curved in a radial direction and disposed in the separation passage of the drum, the first circumferential separator blade extending at least partially around the inner drum wall; and
 a housing disposed around the drum and configured to receive a higher-density component of the fluid separated in the separation passage.

2. The apparatus of claim 1, wherein the first circumferential separator blade is coupled to at least two of the radial separator blades.

3. The apparatus of claim 1, wherein:
 the radial separator blades are coupled to at least one of the inner drum wall and the outer drum wall and are configured to rotate along with the drum; and
 the first circumferential separator blade is coupled to at least two of the radial separator blades and is configured to rotate therewith.

4. The apparatus of claim 1, wherein at least two of the radial separator blades are disposed in a circumferential row at an axial location in the separation passage.

5. The apparatus of claim 1, wherein the radial separator blades each include a leading surface, the leading surface of at least one of the radial separator blades defining a drainage groove that extends radially.

6. The apparatus of claim 5, wherein the first circumferential separator blade includes drainage ports, at least one of the drainage ports being aligned with the drainage groove of the at least one of the radial separator blades.

7. The apparatus of claim 1, wherein a cross-section of at least one of the radial separator blades has flattened "S"-shape.

8. The apparatus of claim 1, wherein a cross-section of the first circumferential separator blade is substantially sine-wave shaped.

9. The apparatus of claim 1, wherein the radial separator blades and the first circumferential separator blade each have a plurality of curves.

10. The apparatus of claim 1, wherein the radial separator blades include first and second radial separator blades that are circumferentially adjacent and have a substantially constant pitch.

11. The apparatus of claim 1, further comprising a second circumferential separator blade disposed around the first circumferential separator blade, wherein the first and second separator blades have a substantially constant pitch.

12. The apparatus of claim 1, further comprising a swirling structure disposed proximal an upstream end of the drum and configured to swirl the fluid to rotate the drum.

13. A method for separating a fluid, comprising:
 introducing the fluid into a separation passage defined in a drum;

rotating the drum to partially separate a higher-density component of the fluid from a lower-density component thereof; and turning the fluid in the separation passage to further separate the higher-density component of the fluid from the lower-density component thereof, comprising:
  turning the fluid in a first circumferential direction using curved radial separator blades; and
  turning the fluid in a first radial direction using a curved circumferential separator blade.

14. The method of claim 13, further comprising swirling the fluid upstream from the drum to rotate the drum.

15. The method of claim 13, further comprising rotating the radial separator blades along with the drum.

16. The method of claim 15, further comprising rotating the curved circumferential separator blade along with the drum.

17. The method of claim 15, wherein:
  a drainage port is defined radially through the curved circumferential separator blade; and
  rotating the drum further comprises expelling an amount of the higher-density component of the fluid separated by turning the fluid in the separation passage through the drainage port.

18. The method of claim 13, wherein turning the fluid in the separation passage further comprises:
  turning the fluid in a second circumferential direction using the curved radial separator blades; and
  turning the fluid in a second radial direction using the curved circumferential separator blade.

19. The method of claim 13, further comprising supporting the drum on a shaft with a magnetic bearing.

20. A rotary separator, comprising:
  a drum including an inner drum wall and an outer drum wall that is separated from the inner drum wall to at least partially define a separation passage therebetween, the drum configured to rotate to separate a liquid from a gas in a multiphase fluid;
  a row of radial separator blades disposed proximal an axial middle of the drum, the radial separator blades extending from the inner drum wall to the outer drum wall and being curved so as to turn fluid flowing therepast in first and second circumferential directions, each radial separator blade defining a radially-extending drainage groove;
  first and second circumferential separator blades disposed in the separation passage, proximal the axial middle of the drum, and extending at least partially around the inner drum wall, the first and second circumferential separator blades being curved so as to turn fluid flowing therebetween in a first and second radial direction, the first and second circumferential separator blades each defining drainage ports therein, each drainage port being aligned with the drainage groove of at least one of the radial separator blades;
  a housing disposed around the rotatable drum and defining a collection chamber in fluid communication with the separation passage; and
  a swirling structure disposed proximal an upstream end of the drum and configured to swirl the fluid to rotate the drum.

* * * * *